United States Patent [19]

Yamaura

[11] Patent Number: 4,470,093
[45] Date of Patent: Sep. 4, 1984

[54] PROTECTIVE RELAY SYSTEM AND SAMPLING SYNCHRONIZING METHOD THEREFOR

[75] Inventor: Mitsuru Yamaura, Tokyo, Japan

[73] Assignee: Tokyo Shibaura Denki Kabushiki Kaisha, Kawasaki, Japan

[21] Appl. No.: 435,547

[22] Filed: Oct. 21, 1982

[30] Foreign Application Priority Data

Oct. 29, 1981 [JP] Japan ................................ 56-173643

[51] Int. Cl.³ .............................................. H02H 7/26
[52] U.S. Cl. ........................................ 361/68; 361/66; 340/310 R; 455/51
[58] Field of Search ...................... 361/68, 69, 79, 81, 361/83, 64, 66, 65; 340/310 R, 310 A, 147 SY, 183; 325/23, 15, 41, 42, 58, 348, 478; 455/51

[56] References Cited

U.S. PATENT DOCUMENTS

| | | | |
|---|---|---|---|
| 3,849,763 | 11/1974 | Greene, Jr. ..................... | 340/310 R |
| 4,071,873 | 1/1978 | Andow et al. .................... | 361/68 X |
| 4,228,476 | 10/1980 | Okita et al. ........................ | 361/68 |
| 4,371,908 | 2/1983 | Andow et al. ..................... | 361/68 X |

FOREIGN PATENT DOCUMENTS 114752 3/1973 Japan .
49-645 5/1975 Japan .
110716 8/1979 Japan .

OTHER PUBLICATIONS

Article "Development of Superimposition Transmission Device", in a Periodical, OHM '76/5, pp. 81-88, Aoki et al., 1976.

Primary Examiner—Patrick R. Salce
Attorney, Agent, or Firm—Stevens, Davis, Miller & Mosher

[57] ABSTRACT

In a protective relay system for an electric power system with relay devices at respective terminals, a synchronous signal is transmitted from each terminal upon occurrence of a fixed time relation with the clock signal subsequent to receipt of a synchronous signal from the opposite terminal. The synchronous signal is associated with time data indicating the relative time of receipt of the synchronous signal with reference to the occurrence of the clock signal. The time deviation of occurrence of the clock signal at each terminal with reference to occurrence of the clock signal at the opposite terminal is detected in accordance with the time data transmitted from the opposite terminal, the time point at which the synchronous signal from the opposite terminal is received, the time point at which the preceding transmission of the synchronous signal toward the opposite terminal took place and the clock signal at each terminal, and is used for phase-adjustment of the clock signal at each terminal.

10 Claims, 9 Drawing Figures

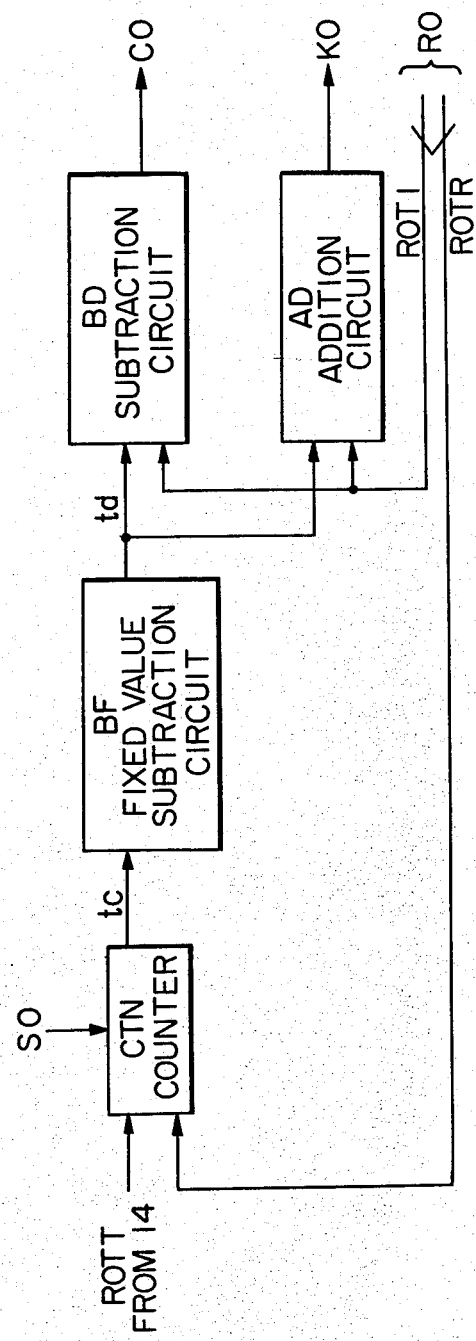
FIG. 3
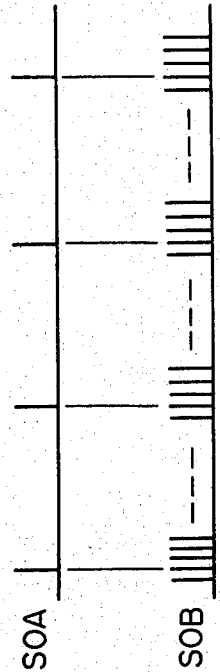
FIG. 4A SOA
FIG. 4B SOB

FIG. 5A
| I0 | | | | |
|----|-----|----|----|-----|
| SY | SD0 | F0 | T0 | CH0 |
FIG. 5B
| I1 | | | | |
|----|-----|----|----|-----|
| SY | SD1 | F1 | T1 | CH1 |
FIG. 6
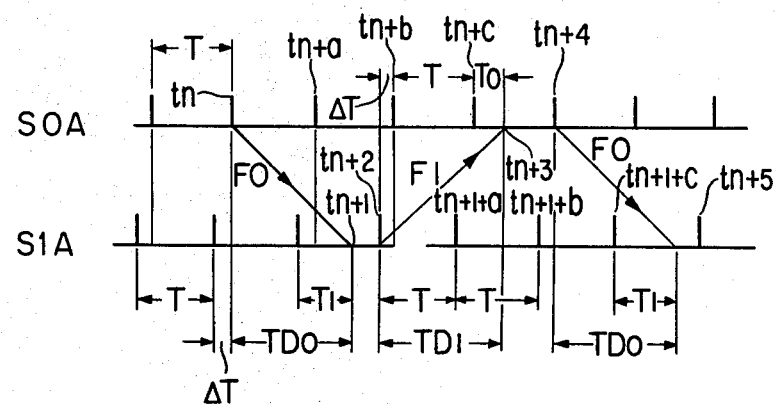
FIG. 7
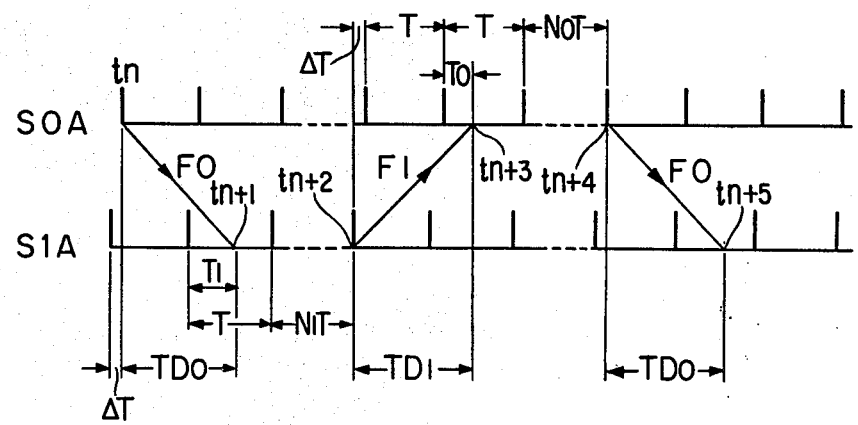

4,470,093

PROTECTIVE RELAY SYSTEM AND SAMPLING SYNCHRONIZING METHOD THEREFOR

BACKGROUND OF THE INVENTION

The present invention relates to a protective relay system for an electric power system and a sampling synchronizing method for synchronizing the sampling of electrical quantity at a plurality of terminals.

A protective relay system is known in which electrical quantity, such as electric current, is sampled at a plurality of positions or terminals in an electric power system, such as a power transmission system, and electrical quantity data in digital form obtained by the sampling is exchanged between the terminals and used for calculation for the purpose of the protective function. In such a system, the sampling at the respective terminals must be synchronized, i.e., the time at which the electrical quantity is sampled at the respective terminals must be made to coincide accurately, to ensure that electrical quantity data obtained by sampling simultaneously is used for the calculation.

There have been proposed various methods for synchronizing the sampling. In a method disclosed in Japanese patent application laid-open (Kokai) No. 110716/1979, the time of the transmission of the digital signal with respect to the time of the sampling is controlled to maintain a predetermined relation to the time of receipt of the digital signal from the opposite terminal with respect to the time of the sampling. A disadvantage of this system is relatively long delay of the transmission of the digital signal after the sampling. Such delay can become as long as almost one sampling period or interval. It is desirable that such delay be avoided particularly where quick-response protection of the electric power system is desired.

In another method which is disclosed in Japanese patent application laid-open (Kokai) No. 49645/1975, the time of transmission of a digital signal relative to the sampling is fixed or maintained constant, and the digital data transmitted contains cyclic additional data indicating indicium or number (1, 2, .... n). At each terminal, subsequent to reception of a digital signal of a certain number (i, $1 \leq i \leq n$), a digital signal of the identical number (i) is transmitted. The length of time from the transmission of the digital signal of a certain number to the subsequent reception of a digital signal of the same number is measured at both terminals, and the sampling timing is adjusted so that the above-mentioned lengths of time measured at the both terminals become equal to each other. A disadvantage of the system is that the amount of information or data to be transmitted is relatively large.

SUMMARY OF THE INVENTION

An object of the invention is to minimize the delay in the transmission of the electrical quantity data.

Another object of the invention is to minimize the amount of information or data to be transmitted.

According to one aspect of the invention, there is provided a sampling synchronizing method for use in a protective relay system for an electric power system wherein electrical quantity is sampled at at least a pair of terminals, said sampling at each terminal being made in synchronism with a clock signal produced at each terminal, and electrical quantity data obtained by the sampling at each terminal of said pair is transmitted to the opposite terminal of said pair to be used for protection at said opposite terminal, the clock signals at the terminals of said pair having the same frequency, said method comprising the steps of:

transmitting from each terminal of said pair, a synchronous signal upon N-th (N being a natural number) occurrence of a fixed time relation with the clock signal at each terminal, subsequent to receipt of a synchronous signal from the opposite terminal, the fixed time relation being common at both terminals of said pair, the synchronous signal transmitted toward at least one terminal of said pair being associated with time data indicating the relative time of receipt of the synchronous signal at the opposite terminal with reference to the occurrence of the clock signal, receiving at each terminal of said pair the synchronous signal and the time data, if associating, transmitted from the opposite terminal, detecting, at said at least one terminal, in accordance with the time data transmitted from the opposite terminal, the time point at which the synchronous signal from the opposite terminal is received, the time point at which the preceding transmission of the synchronous signal toward the opposite terminal took place, and the clock signal at each of said at least one, the time deviation of occurrence of the clock signal at each of said at least one terminal with reference to occurrence of the clock signal at the opposite terminal, and adjusting, at said at least one terminal, in accordance with the detected time deviation, the time point of occurrence of the clock signal.

According to another aspect of the invention, there is provided a protective relay system for an electric power system having relay devices each provided at each of at least a pair of terminals for sampling electrical quantity in synchronism with a clock signal produced at each terminal and producing electrical quantity data indicating the sampled electrical quantity, and data exchange devices each provided at each of the terminals for transmitting the electrical quantity data toward the opposite terminal of said pair and receiving the electrical quantity data transmitted from the opposite terminal of said pair, said relay device at each terminal of said pair being responsive to the electrical quantity data transmitted from the opposite terminal for performing protection of the electric power system, the clock signals at the terminals of said pair having the same frequency, said data exchange device at each terminal comprising:

a clock signal generating circuit periodically generating said clock signal, a transmitting circuit transmitting a synchronous signal upon N-th (N being a natural number) occurrence of a fixed time relation with the clock signal at each terminal, subsequent to receipt of a synchronous signal from the opposite terminal, the fixed time relation being common at both terminals, the transmitting circuit at at least one terminal of said pair further transmitting time data in association with the synchronous signal, said time data indicative of the relative time of receipt of the synchronous signal from the opposite terminal with reference to the occurrence of the clock signal, and a receiving circuit receiving the synchronous signal and the time data, if associating, transmitted from the opposite terminal, and the data exchange device at each of said at least one terminal further comprises:

time deviation detecting means detecting, in accordance with the time data transmitted from the opposite terminal, the time point at which the synchronous signal from the opposite terminal is received, the time point at which the preceding transmission of the synchronous signal toward the opposite terminal took place, and the clock signal at each of said at least one terminal, the time deviation of occurrence of the clock signal at each of said at least one terminal with reference to occurrence of the clock signal at the opposite terminal, said clock signal generating circuit at said one terminal being adapted to be adjusted as to the time point of occurrence of the clock signal in accordance with the detected time deviation.

BRIEF DESCRIPTION OF THE DRAWINGS

In the accompanying drawings:

FIG. 3 is a block diagram showing an example of the time deviation detecting circuit 15 shown in FIG. 2;

FIGS. 4A and 4B are diagrams showing the clock pulses produced by the clock signal generating circuit 13 shown in FIG. 2;

FIGS. 5A and 5B are diagrams showing the format of the digital data frame I0, I1 exchanged between the terminals; and FIGS. 6 and 7 are time charts illustrating the clock pulses S0A, S0B at the opposite terminals and the exchange of the synchronous signals F0, F1.

DESCRIPTION OF A PREFERRED EMBODIMENT

Figure 1:
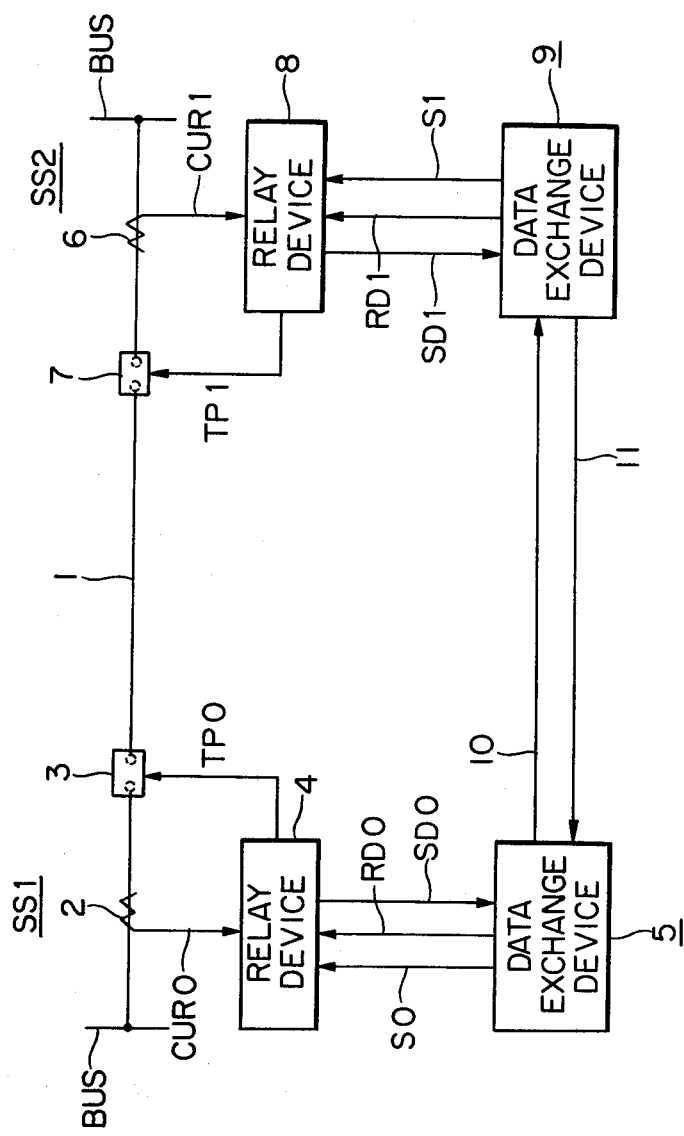
FIG. 1 is a block diagram showing a protective relay system.

Referring now more particularly to FIG. 1, there is shown a protective relay system comprising a pair of relay devices 4 and 8 provided at a first terminal SS1 and a second terminal SS2 opposite to each other across a transmission line 1. Provided at the respective terminals are current transformers 2 and 6 for detecting the current through the transmission line 1, circuit breakers 3 and 7 operative responsive to the relay devices 4 and 8, and data exchange devices 5 and 9 associated with the respective relay devices 4 and 8 and exchanging data between the terminals SS1 and SS2.

More specifically, the relay devices 4 and 8 respectively receive the currents CUR0 and CUR1 from the secondary windings of the current transformers 2 and 6 and periodically sample the currents and digitize them to obtain current data SD0 and SD1 which are exchanged between the data exchange devices 5 and 9 and used for calculation for protective function in the relay devices 4 and 8. When, as a result of the calculation, the transmission line 1 is found to be in a state requiring disconnection, the relay devices 4 and 8 produce trip signals TP0 and TP1 to cause operation or tripping of the circuit breakers 3 and 7.

Figure 2:
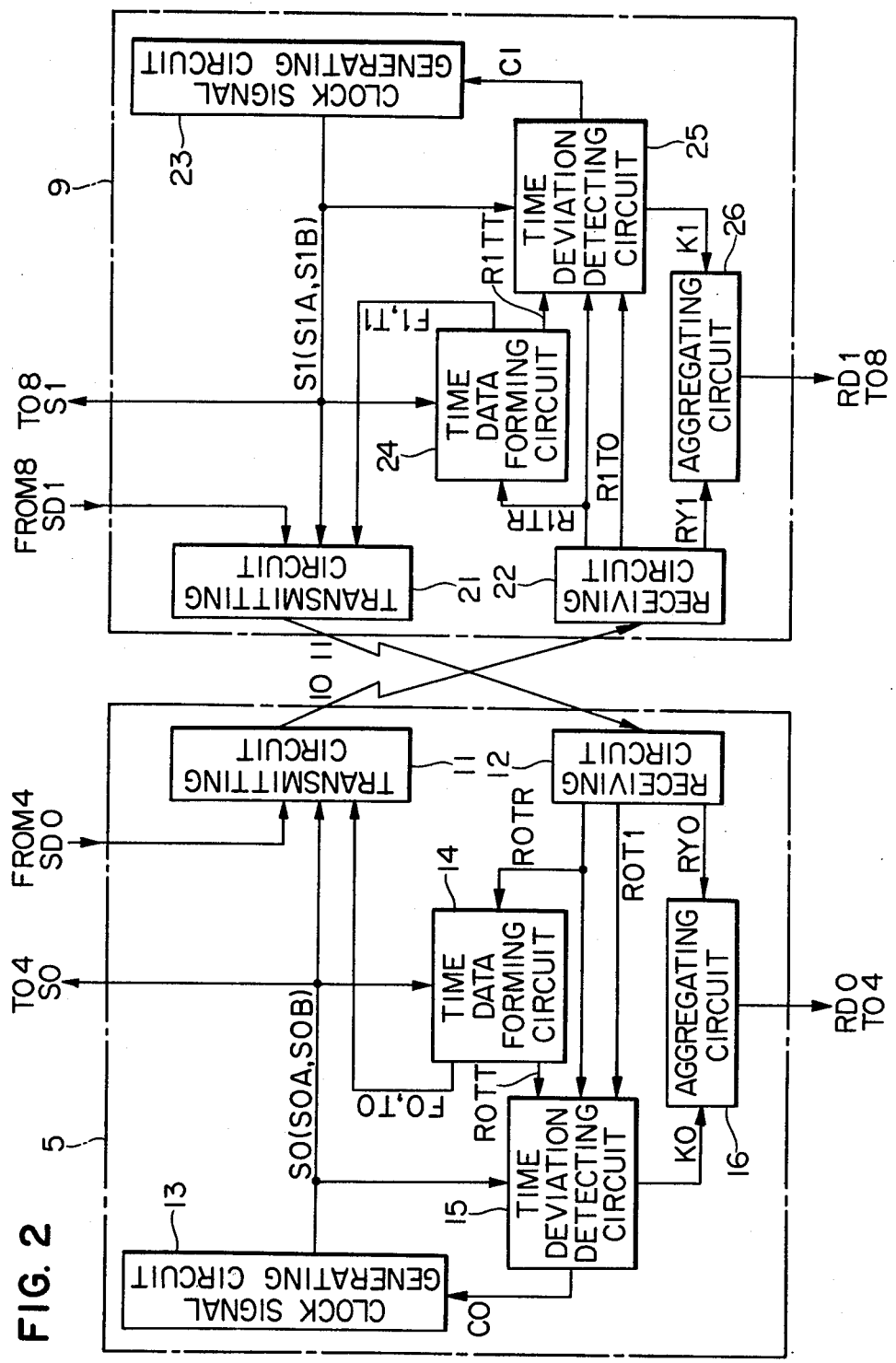
FIG. 2 is a block diagram showing data exchange devices at opposite terminals according to an embodiment of the invention.

FIG. 2 shows the internal construction of the data exchange devices 5 and 9. Clock signal generating circuits 13 and 23, each comprising a well-known oscillator, generate periodical clock signals S0 and S1 at the same frequency. The clock signals S0 and S1 respectively include first clock pulses S0A and S1A (FIG. 4A)

produced at the same frequency, and are supplied to the relay devices 4 and 8. The sampling of the currents at the relay devices 4 and 8 is effected in synchronism with and in the same fixed relationship with the occurrence of the clock pulses S0A and S1A. For instance, the sampling is effected upon the occurrence of the clock pulses S0A, S1A. The clock signals S0 and S1 also include clock pulses S0B and S1B (FIG. 4B) having at the same frequency. The frequency of the clock pulses S0B and S1B is a multiple of the frequency of the clock pulses S0A and S1A and the clock pulses S0B and S1B are synchronized with the clock pulses S0A and S1A. Such relationship between the clock pulses S0A and S1A, and S0B and S1B can be achieved by forming the clock pulses S0A and S1A by frequency-dividing the clock pulses S0B and S1B.

Signal transmitting circuits 11 and 21 receive current data SD0 and SD1 from the relay devices 4 and 8, and transmit, toward the data exchange devices 9 and 5 of the opposite terminals, the data SD0 and SD1 as part of digital data frames I0 and I1. The transfer of the current data SD0 and SD1 from the relay devices 4 and 8 to the transmitting circuits 11 and 12, and the transmission of the data frames I0 and I1 are effected every time the pulses S0A and S1A are produced. When a certain condition, which will be described later, is fulfilled at either terminal, synchronous signal F0 or F1 is produced by a time data forming circuit 14 or 24 (which will be described later). The transmitting circuit 11 or 21 then transmits, together with the current data SD0 or SD1, the synchronous signal F0 or F1 and time data T0 or T1, as part of the data frame I0 or I1.

Signal receiving circuits 12 and 22 receive data I1 and I0 transmitted from the transmitting circuits 11 and 21 of the opposite terminals SS2 and SS1, and produce current data RY0 and RY1 which are, in the significance, identical to the data SD1 and SD0, respectively. The data RY0 and RY1 are transferred to the relay devices 4 and 5 for calculation for protection. When the received data frame I1 or I0 contains the synchronous signal F1 or F0, the receiving circuit 12 or 22 also produces a reception signal R0TR or R1TR indicating the reception of the synchronous signal F1 or F0, and the time data R0T1 or R1T0, which is in the significance, identical to the time data T1 or T0. Each of the reception signals R0TR and R1TR may comprise a pulse produced when the synchronous signal F1 or F0 is received.

The time data forming circuit 14 is responsive to the reception signal R0TR and the clock signal S0, and produces a synchronous signal F0 and time data T0 indicating the time of reception of the synchronous signal F1 at the receiving circuit 12. The time of reception is expressed relative to the time of occurrence of the clock pulse S0. In other words, the length of time $T_0$ (by which the reception lags behind the occurrence of the clock pulse) as indicated in FIG. 6 is measured and data indicative of such length of time or relative time is produced.

Upon next occurrence of the clock pulse S0A, the transmitting circuit 11 transmits the synchronous signal F0 and the time data T0 as part of the transmitted data frame. When the synchronous signal F0 is transmitted, the time data forming circuit 14 provides a transmission signal R0TT, which may be a pulse produced simultaneously with the occurrence of the clock pulse S0A.

The time data forming circuit 24 at the opposite terminal has a function similar to the circuit 14, and the transmitting circuit 21 acts in a similar manner.

When the data exchange devices 5 and 9 start operation, a synchronous signal F0 or F1 is formed at either of the terminals, and the time data T0 or T1 associating the synchronous signal F0 or F1 can be arbitrarily determined, e.g., at a value indicating that $T_0$ or $T_1$ is zero.

FIG. 5A shows a format of digital data frame I0, which includes a frame synchronous signal SY. The current data SD0 is the data indicative of the current sampled. The area for the synchronous signal F0 is "1" when the synchronous signal exists, and is "0" when the synchronous signal does not exist. The synchronous signal also acts as a flag indicating whether or not the data in the following area T0 is significant. If the flag F0 is "1", the data in the area T0 is the time data supplied from the time data forming circuit 14. If the flag F0 is "0", the data in the area T0 is insignificant, and is disregarded at the receiving terminal. A checking signal CH0 is added for error detection.

Digital data frame I1 has a format as shown in FIG. 5B, which is similar to that of the digital data frame I0 and includes a frame synchronous signal SY identical to that of the digital data frame I0, current data SD1, a synchronous signal F1, a time data T1 and a checking signal CH1.

The data frames I0 and I1 are transmitted from the transmitting circuits 11 and 21 at the same fixed timing relationship with the clock pulses S0A and S1A. For instance, the transmission of the data frame I0 is commenced (i.e., the foremost part of the synchronous signal SY is transmitted) when the clock pulse S0A is produced, and the transmission of the data frame I1 is commenced when the clock pulse S1A is produced.

The time points of transmission and the time of reception of the digital data frames I0 and I1 including the synchronous signals F0 and F1 are therefore represented by the time points at which the transmission or the reception of the data frames I0 and I1 is commenced (i.e., at which the foremost part of the frame synchronous signal SY is transmitted or received).

A time deviation detecting circuit 15 receives the transmission signal R0TT, the reception signal R0TR, the time data R0T1, and the clock pulses S0B, and calculates or detects the deviation in time of occurrence of the clock pulse S0A with respect to the time of occurrence of the clock pulse S1A at the opposite terminal. It also calculates or detects the transmission time, i.e., the length of time from transmission of a synchronous signal at one terminal to the reception of the same synchronous signal at the opposite terminal.

The principle of the calculation of the time deviation and the transmission time will now be described.

FIG. 6 shows a time chart showing the relationship between the clock pulses S0A and S1A, and the time points of transmission and reception of the synchronous signals F0 and F1. It is assumed that the time deviation of the occurrence of the clock pulses S0A with respect to the occurrence of the clock pulses S1A is $-\Delta T$ (lagging). In other words the time deviation of the occurrence of the clock pulses S1A with respect to the occurrence of the clock pulses S0A is $\Delta T$ (leading). The synchronous signal transmitted at a time point $t_n$ (the transmission of the data frame I0 in which it is included is commenced at $t_n$) travels the transmission path taking a transmission time $TD_0$ and reaches the opposite terminal SS2 at $t_{n+1}$. Upon the next occurrence $t_{n+2}$ of a clock pulse S1B, the synchronous signal F1 is transmitted and travels the same transmission path (in the opposite direction) taking a transmission time $TD_1$ and reaches the terminal SS1 at $t_{n+3}$. Upon the next occurrence $t_{n+4}$ of the clock pulse S0A, the synchronous signal F0 is again transmitted, and the same sequence is repeated. It will be appreciated that the data frames are also transmitted at the occurrence, e.g. at $t_{n+a}$, $t_{n+b}$, $t_{n+c}$, $t_{n+1+a}$, $t_{n+1+b}$, $t_{n+1+c}$, other than the occurrence of the clock pulses at which the synchronous signal F0 or F1 is transmitted, but they do not include any synchronous signal, i.e., their flags in the area F0 or F1 is "0".

The data frames containing the synchronous signal also contain time data indicating the time, relative to the clock pulse occurrence, of the preceding reception of the synchronous signal from the opposite terminals. For instance, the data frame I1 transmitted at $t_{n+2}$ contains time data indicating the time $T_1$ by which the reception $(t_{n+1})$ of (the data frame containing) the synchronous signal F0 from the opposite terminal lags behind the preceding occurrence of a clock pulse S1B. Similarly, the data frame I0 transmitted at $t_{n+4}$ contains time data T0 indicating the time $T_0$ by which the reception $(t_{n+3})$ lags behind the preceding clock pulse S0A.

From observation of FIG. 6, it will be seen that there is the following relationship:

$$TD_0 = t_{n+1} - t_n = t_{n+5} - t_{n+4} \atop TD_1 = t_{n+3} - t_{n+2}\Bigg\} \quad (1)$$

For ordinary transmission paths, the following relationship exists for practical purposes:

$$TD_0 \div TD_1 = TD \quad (2)$$

It will also be observed from FIG. 6:

$$t_{n+3} - t_n = TD_0 + T - T_1 + TD_1 \quad (3)$$

$$t_{n+5} - t_{n+2} = TD_1 + T - T_0 TD_0 \quad (4)$$

$$TD_0 + \Delta T = mT + T_1 \text{ (m being a natural number, and being equal to "1" in the illustrated example)} \quad (5)$$

$$TD_1 = \Delta T + nT + T_0 \text{ (n being a natural number, and being equal to "1" in the illustrated example)} \quad (6)$$

From the equations (2), (3) and (5), $$TD = (t_{n+3} - t_n - T + T_1)/2 \quad (7)$$

$$-\Delta T = \{(t_{n+3} - t_n T - T_1)/2\} - mT \quad (8)$$

From the equations (2), (4) and (6), $$TD = (t_{n+5} - t_{n+2} - T + T_0)/2 \quad (9)$$

$$\Delta T = \{(t_{n+5} - t_{n+2} - T - T_0)/2\} - nT \quad (10)$$

Referring to the equations (7) and (8), the variables, except m, on the right sides are obtained at the terminal SS1. That is, the time length $(t_{n+3} - t_n)$ can be measured at the terminal SS1. The time length $T_1$ is transmitted from the opposite terminal as the time data T1. Moreover, the period T is known. Although M in itself is not given, $-\Delta T$ can be obtained in the light of the fact that $|-\Delta T| < T$. For instance, when $\{(t_{n+3} - t_n - T - T_1)/2\}$ is calculated, one may simply repeat subtracting T until the answer becomes a negative value (for the first time). This can be achieved using a subtracting circuit having a full scale equal to the value of T.

Similar consideration applies to the equations (9) and (10), and TD and ΔT can be determined at the terminal SS2.

An example of the time deviation detecting circuit 15 is shown in FIG. 3. It comprises a counter CTN which is reset by or starts counting upon the reception of the transmission signal R0TT, and counts the clock pulses S0B, and stops counting when the reception signal R0TR is supplied.

The count value of the counter CTN when it stops counting indicates the length of time $t_c = t_{n+3} - t_n$ (FIG. 6) from the transmission of a synchronous signal F0 to the subsequent reception of the synchronous signal F1. The count value ($t_c$) is supplied to a fixed value subtraction circuit BF, comprising a fixed value producing device for producing a fixed value signal indicative of the period T and a subtraction circuit where the period T is subtracted from $t_c$. The output $t_d$ ($=t_c-T$) of the circuit BF is supplied to a subtraction circuit BD, which also receives the time data R0T1 and subtracts $T_1$ from $t_d$, and divides the difference ($t_d-T_1$) by 2. The division by 2 can be achieved by shifting, by one bit, the binary number. The subtraction circuit BD has a full scale corresponding to the period of T. Thus, the combination of the circuits CTN, BF and BD performs, in effect, the following calculation.

$$(t_d - T_1)/2 - mT = (t_{n+3} - t_n - T - T_1)/2 - mT = -\Delta T.$$

The output C0 of the subtraction circuit BD is thus indicative of $-\Delta T$.

The output $t_d$ of the circuit BF is also supplied to an addition circuit AD, which also receives the time data R0T1 and adds $T_1$ to $t_d$, and divides the sum ($t_d+T_1$) by 2. Thus, the combination of the circuits CTN, BF and AD performs, in effect, the following calculation:

$$(t_d + T_1)/2 = (t_{n+3} - t_n - T + T_1)/2 = TD.$$

The output K0 of the addition circuit AD is thus indicative of TD.

The output C0 of the subtraction circuit BD and the output K0 of the addition circuit AD form outputs C0 and K0 of the time deviation detecting circuit 15. The output C0 is applied, as a phase adjusting signal, to the clock signal generating circuit 13 and phase-adjusts the circuit 13 to be in synchronism with the circuit 23 of the opposite terminal, i.e., to make $-\Delta T$ closer to zero, in a manner which itself is well-known in the art.

The output K0 is synthesized or aggregated with the data RY0 at an aggregating circuit 16 and the data aggregated (The data are not subject to alteration in contents but, for instance, the conductors carrying the signals are simply collected) are supplied, as a received data RD0, to the relay device 4. The data K0 in the data RD0 is used for determination, performed in the relay device 4, of the time point at which the synchronous signal (with the associated data) is transmitted. The manner in which the transmission time point is determined in accordance with TD is well known, so that explanation thereof will be omitted.

The data exchange device 9 has a time deviation detecting circuit 25 and a signal aggregating circuit 26, which are similar to the circuits 15 and 16, and clock signal generating circuit 23 is phase-adjusted by a signal C1 similar to C0, and the relay device 8 receives a signal K1 similar to K0 and performs the function similar to that which the relay device 4 performs.

As will be understood, the synchronous signal F0 or F1 can comprise a single bit and the time data T0 or T1 needs only to indicate the time length within the range of from zero to T, so that the amount of information to be exchanged for the synchronization is relatively small. Moreover, the time length required for completion of one cycle of operation (from $t_n$ to $t_{n+3}$, for instance) is relatively short, so that the time deviation is quickly rectified.

In the embodiment described, the time points of the reception of the synchronous signal F0, F1 is represented by the time points of the transmission and reception of the foremost part of the frame synchronous signal SY of the digital data frame I0, I1 containing the synchronous signal F0, F1. But, they can be represented by any other time points. For instance, the time points at which the synchronous signal itself is transmitted or received can be regarded as representative.

In the embodiment described, the time of the transmission of the synchronous signal F0, F1 (as represented by the time of the transmission of the foremost part of the frame synchronous signal SY) coincides with the occurrence of the clock pulse S0A, S1A. But the arrangement may alternatively such that the transmission of the synchronous signal F0, F1 takes place at other time point, but at a fixed time relation with the occurrence of the clock pulses S0A, S1A, with the fixed time relation being common at both terminals. It may be questioned whether the time difference between the occurrence of the clock pulses S0A, S1A must be taken account of in determining the time deviation ΔT and the transmission time TD. But analysis will show that as far as said fixed time relation is common at both terminals, the time difference in question is cancelled and does not appear in the ultimate equations for determining ΔT and TD.

In the embodiment described, the time data indicates the time $T_0$, $T_1$ by which the reception of the synchronous signal lags behind the preceding clock pulse S0A, S1A. But, the time data may alternatively indicate the time $T-T_0$, $T-T_1$ by which the reception of the synchronous signal leads the next subsequent clock pulse S0A, S1A.

In the embodiment described, the transmission signal is produced by the time data forming circuit 14, 24. But there may be provided a separate device which may be adapted to receive the clock pulse S0A and a signal from the time data forming circuit 14, 24 indicating that the time data has been produced, and produces the transmission signal when the synchronous signal is transmitted by the transmitting circuits 11, 21 toward the opposite terminal.

In the embodiment described, the whole of the time data T0 or T1 is transmitted in a single data frame. But, the time data T0, T1 may be transmitted by means of subcommutation technique. That is, the time data is divided, and fractions of the time data T0, T1 are successively transmitted as part of respective data frames. In this case, the flag F0, F1 serve to indicate the beginning of the transmission of the time data T0, T1.

The function of the aggregating circuit 16, 26 is to aggregate or integrate without alteration in the contents or the significance of the data K0, K1 and RY0, RY1.

Where the data K0, K1 and RY0, RY1 are respectively bit parallel data, the aggregating circuit 16, 26 is formed of a location or part of the conductors carrying the data at which the conductors are physically junctioned.

In the embodiment described, the synchronous signal F0, F1 is transmitted upon next occurrence of the clock pulse S0A, S0B subsequent to receipt of the synchronous signal F1, F0 from the opposite terminal. But such transmission can be made, as shown in FIG. 7, at the $(N_0+1)$-th or $(N_1+1)$-th ($N_0$, $N_1$ being a predetermined natural number) occurrence of the clock pulse S0A, S1A subsequent to receipt of the synchronous signal F1, F0 from the opposite terminal. Under such circumstances, the following equations hold instead of the equations (7) to (10):

$$TD = (t_{n+3} - t_n - T - N_1 T + T_1)/2 \tag{7}'$$

$$-\Delta T = \{(t_{n+3} - t_n - T - N_1 T + T_1)/2\} - mT \tag{8}'$$

$$TD = (t_{n+5} - t_{n+2} - T - N_0 T + T_0)/2 \tag{9}'$$

$$\Delta T = \{(t_{n+5}t_{N+2} - T - N_0 T - T_0)/2\} - nT \tag{10}'$$

Since the natural numbers $N_0$, $N_1$ are predetermined and known, TD, $-\Delta T$, $\Delta T$ can be determined in the same manner as in the embodiment described. The numbers $N_0$ and $N_1$ can be selected to optimize the time length for one cycle of exchange of the synchronous signal, e.g., $t_n$ to $t_{n+4}$.

In the embodiment described, the clock signal generating circuits 13 and 23 at both terminals are phase-adjusted. This arrangement is advantageous in that the time for rectifying any time deviation is shorter. But, the arrangement may alternatively be such that only at one terminal (e.g., at SS1) is the clock signal generating circuit (13) phase-adjusted and the clock signal of the clock signal generating circuit (23) of the opposite terminal (SS2) is used as a reference. This arrangement is particularly useful where there are more than three terminals and the clock signals at the respective terminals need to be synchronized with each other. In such a case, one of the terminals is selected as one providing a reference clock signal, and synchronous signals are exchanged between said one of the terminals and the rest of the terminals to attain synchronization, and the transmission of the time data toward the terminal at which the phase-adjustment is not made and the formation of the time data at the terminal opposite to the terminal at which the phase-adjustment is not made can be omitted.

The invention has been described as applied to a protective relay system wherein electric currents through the transmission line are detected and the digital data indicative of the detected current is exchanged. But, the invention is also applicable to a protective relay system wherein any other electrical quantity is detected and the data on the detected electrical quantity is exchanged.

The invention has been described as it is applied to a protective relay system for transmission line. But the invention is also applicable to a protective relay system for any other electric power system.

What is claimed is:

1. A sampling synchronizing method for use in a protective relay system for an electric power system having at least one pair of terminals at each terminal of which an electrical quantity is sampled to provide electrical quantity data, each terminal in said at least one pair of terminals being at opposite locations, said sampling at each terminal being made in synchronism with a clock signal produced at each terminal, wherein electrical quantity data obtained by said sampling at each terminal of said at least one pair is transmitted to an opposite terminal of said at least one pair to be used for protection at said opposite terminal, said clock signal produced at each terminal in said at least one pair having a same frequency, said method comprising the steps of:
transmitting from each terminal of said at least one pair a synchronous signal upon an N-th occurrence of a fixed time relation with a said clock signal at each terminal of said at least one pair subsequent to receipt of a synchronous signal from said opposite terminal of said at least one pair, said fixed time relation being common at both terminals of said at least one pair, N being a natural number, synchronous signals transmitted toward at least one terminal of said at least one pair being associated with time data indicating a relative time of receipt of a said synchronous signal at said opposite terminal with reference to occurrence of a said clock signal, receiving at each terminal of said at least one pair a synchronous signal and any associated time data transmitted from said opposite terminal, detecting at said at least one of said at least one pair in accordance with time data transmitted from said opposite terminal a time point at which a said synchronous signal from said opposite terminal is received, a time point at which an immediately preceding transmission of a said synchronous signal toward said opposite terminal took place, a said clock signal at each said at least one terminal of said at least one pair, and a time deviation of occurrence of a said clock signal at each said at least one terminal of said at least one pair with reference to occurrence of a said clock signal at said opposite terminal, and adjusting at said at least one terminal of said at least one pair in accordance with a detected said time deviation a time point of occurrence of a said clock signal.

2. The method according to claim 1, further comprising the steps of:
producing a reception signal at said time point when a said synchronous signal from said opposite terminal is received, and
producing a transmission signal at said time point when a said immediately preceding transmission of a said synchronous signal took place,
wherein detection at said step of detecting a said deviation is made in accordance with a reception signal and a transmission signal.

3. The method according to claim 1, wherein said natural number N is 1.

4. The method according to claim 1, wherein said synchronous signal transmitted toward each terminal of said at least one pair is associated with time data and detection at said step of detecting a said time deviation and adjustment at said step of adjusting a said time point of occurrence of said clock signal are effected at each terminal of said at least one pair.

5. The method according to claim 1, wherein an electrical quantity is sampled at at least three terminals, and one particular terminal forms a pair with each other terminal and a said synchronous signal transmitted toward each said other terminal is associated with said time data and detection at said step of detecting and adjustment at said step of adjusting are effected only at each said other terminal.

6. A protective relay system for an electric power system having a relay device provided at each terminal of at least one pair of terminals for sampling an electrical quantity in synchronism with a clock signal produced at each terminal of said at least one pair and for producing electrical quantity data indicating said sampled electrical quantity, and a data exchange device provided at each terminal of said at least one pair of terminals for transmitting said electrical quantity data toward an opposite terminal of said at least one pair and for receiving said electrical quantity data transmitted from said opposite terminal of said at least one pair, a said relay device at each terminal of said at least one pair being responsive to said electrical quantity data transmitted from said opposite terminal for protecting said electric power system, said clock signals produced at each terminal of said at least one pair having the same frequency, said data exchange device at each terminal comprising:

a clock signal generating circuit periodically generating a said clock signal, a transmitting circuit for transmitting a synchronous signal upon an N-th occurence of a fixed time relation with a said clock signal at each terminal of said at least one pair subsequent to receipt of a synchronous signal from said opposite terminal, said fixed time relation being common at both terminals of said at least one pair, N being a natural number, a said transmitting circuit at each terminal opposite to a said at least one terminal of said at least one pair further transmitting time data in association with a said synchronous signal, said time data indicating a relative time of receipt of a said synchronous signal from said opposite terminal with reference to occurrence of a said clock signal, and a receiving circuit at each said at least one terminal of said at least one pair for receiving a said synchronous signal and any associated time data transmitted from said opposite terminal, and said data exchange device at each said at least one terminal of said at least one pair further comprising:

a time deviation detecting means detecting in accordance with time data transmitted from said opposite terminal a time point at which a said synchronous signal from said opposite terminal is received, a time point at which an immediately preceding transmission of a said synchronous signal toward said opposite terminal took place, a said clock signal at each said at least one terminal of said at least one pair, and a time deviation of occurrence of a said clock signal at each said at least one terminal of said at least one pair with reference to occurrence of a said clock signal at said opposite terminal, a said clock signal generating circuit at a said at least one terminal of said at least one pair being adapted to be adjusted as to a time point of occurrence of a said clock signal in accordance with a said detected time deviation.

7. The system according to claim 6, wherein said at least one terminal of said at least one pair includes a said receiving circuit which is adapted to produce a reception signal when it receives a synchronous signal from a said opposite terminal and a said time deviation detecting means which receives a said reception signal as a signal indicating a said time point at which a said synchronous signal from a said opposite terminal is received.

8. The system according to claim 7, wherein a said data exchange device at a terminal opposite to said at least one terminal of said at least one pair further comprises a time data forming circuit responsive to a said clock signal and a said reception signal for producing said time data, a said transmitting circuit at a same terminal as a said time data forming circuit being responsive to and transmitting said time data produced by a said time data forming circuit.

9. The system according to claim 6, wherein a said data exchange device at said at least one terminal of said at least one pair further comprises transmission signal forming means producing a transmission signal when a said synchronous signal is transmitted by a said transmitting circuit toward said opposite terminal, and wherein said time deviation detecting means receives a said transmission signal as a signal indicating a time point of transmission of a said synchronous signal.

10. The system according to claim 6, wherein a said transmitting circuit at each terminal of said at least one pair transmits time data and a said data exchange device at each terminal further comprises transmission time detecting means detecting in accordance with time data transmitted from said opposite terminal a time point at which a said synchronous signal from said opposite terminal is received, a time point at which an immediately preceding transmission of a said synchronous signal toward said opposite terminal took place, a said clock signal, and a transmission time taken for transmission of a said synchronous signal from said opposite terminal to said each terminal of said at least one pair, and said relay device at said at least one terminal of said at least one pair being responsive to a detected said transmission time for determining a time point at which a said synchronous signal is transmitted at said opposite terminal toward said each terminal of said at least one pair.

* * * * *